June 10, 1930.　　　　J. FRASER　　　　1,763,427
APPARATUS FOR THE MEASUREMENT OF LIQUIDS
Filed March 10, 1928　　　2 Sheets-Sheet 1
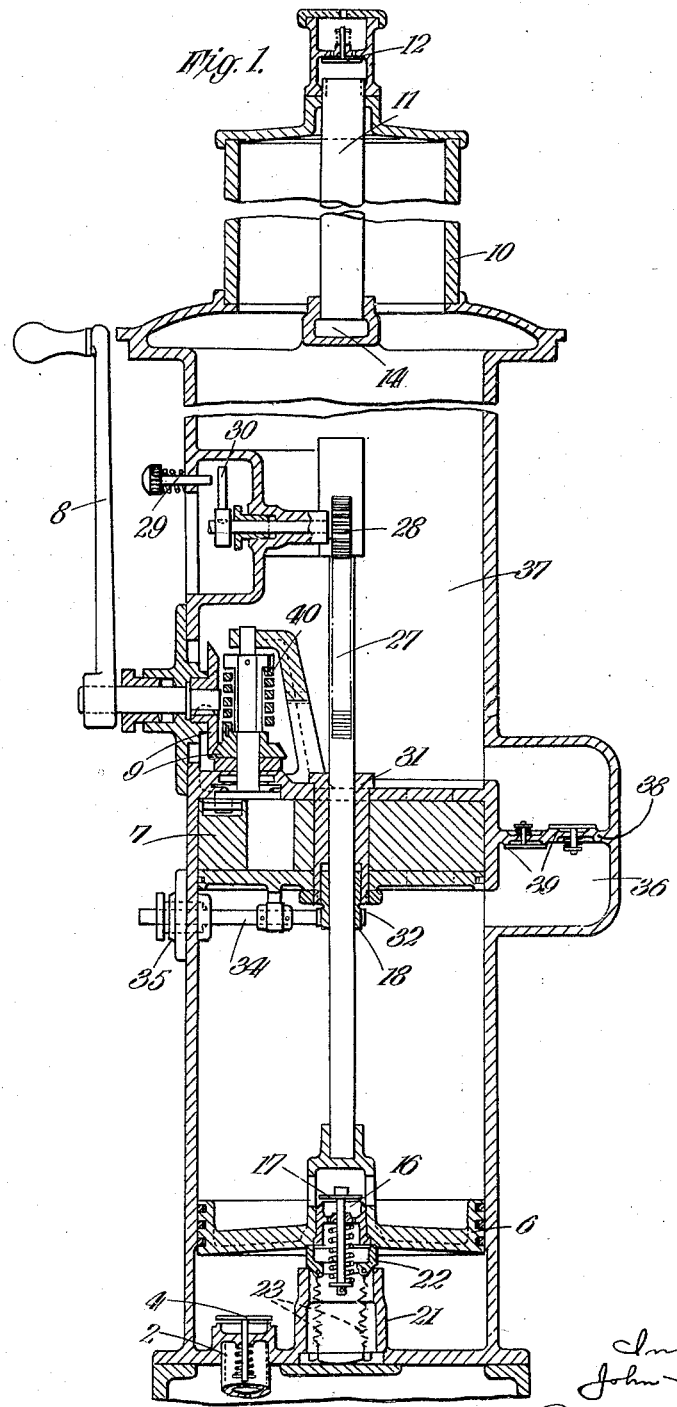

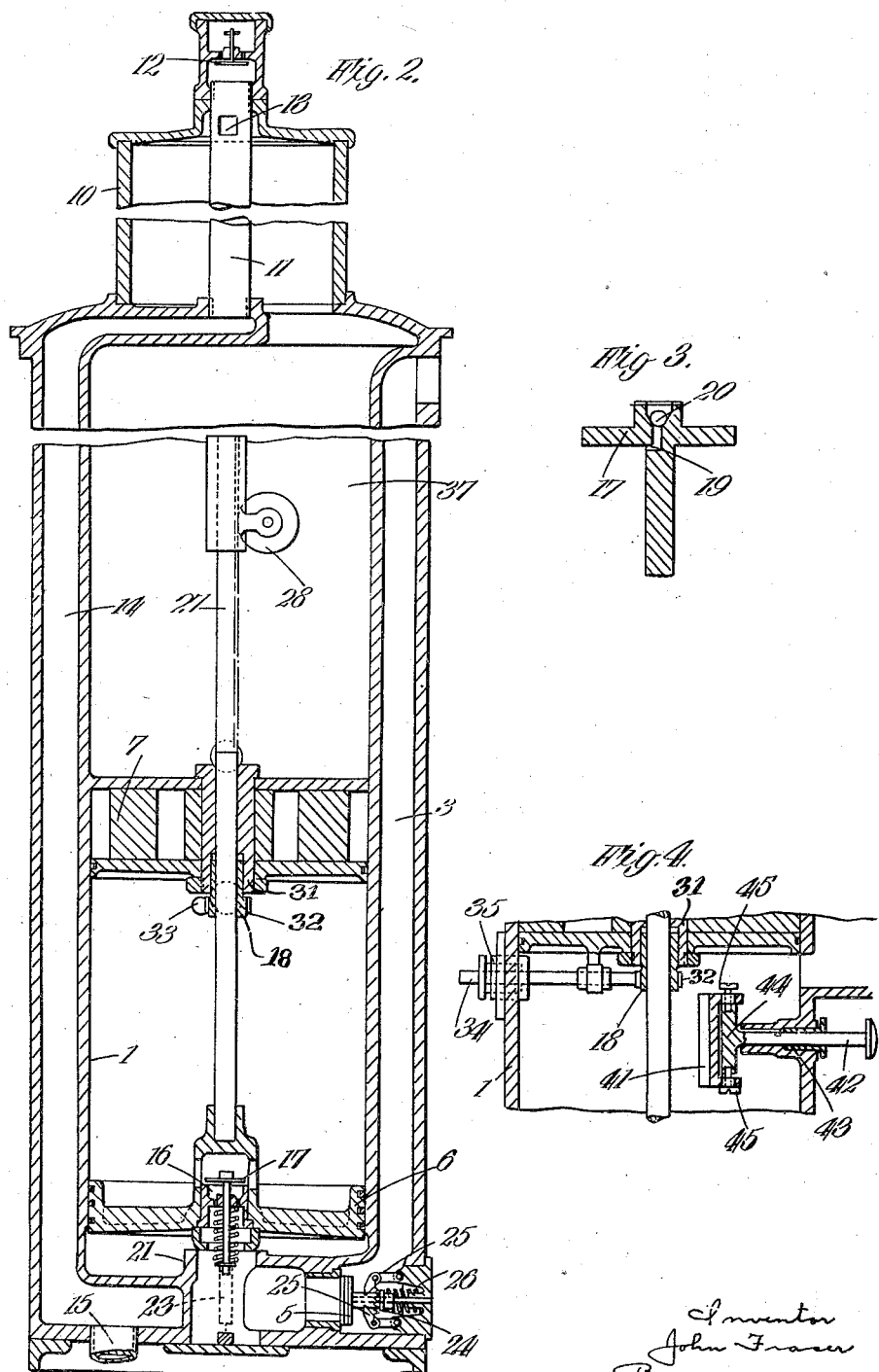

Patented June 10, 1930

1,763,427

UNITED STATES PATENT OFFICE

JOHN FRASER, OF LECKMELM-BY-GARVE, SCOTLAND, ASSIGNOR TO BRITISH PETROLEUM COMPANY, LIMITED, OF LONDON, ENGLAND, A BRITISH COMPANY

APPARATUS FOR THE MEASUREMENT OF LIQUIDS

Application filed March 10, 1928, Serial No. 260,681, and in Great Britain March 15, 1927.

The present invention relates to apparatus for the measurement of liquids, and is especially applicable to pumps, such as those frequently installed at garages and other places for the purpose of delivering measured quantities of motor spirit, but the invention is not to be regarded as restricted in its use to this form of measuring apparatus. In apparatus of the type referred to it is frequently desirable for the user to be able to see the measured quantity of liquid which is being delivered, and for this purpose it has already been proposed to pass this liquid through a vessel wholly or partially made of glass and graduated so that the quantity measured and delivered can be checked. In such apparatus the liquid is usually first pumped or otherwise introduced into the transparent vessel, from which it is delivered either by gravity or by compressed air. If the former method be adopted delivery is necessarily slow, but while this objection may be overcome by the use of compressed air such a method of emptying the vessel is liable to introduce error in the delivery due to imperfect draining, an objection to which the gravity-emptied type of apparatus is also open. Further, in pumps having a visible delivery of liquid as hitherto constructed it has been found difficult, if not infeasible, in using a "swing-arm", such as commonly employed in motor spirit pumps as above referred to, unless the measuring vessel be placed at a higher level than the arm, to empty the latter completely. It is the object of the present invention to produce an apparatus in which there is a visible indication of the measured quantity of liquid delivered, while at the same time the above mentioned drawbacks are avoided.

According to this invention the liquid is introduced into and then delivered from a measuring chamber, while simultaneously another chamber the contents of which are visible is first filled with liquid and a quantity corresponding to that delivered is withdrawn in effecting delivery of the liquid from the measuring chamber. By means of suitable graduations the amount actually delivered may thus be accurately checked.

In order that the invention may be clearly understood and readily carried into effect, it will now be described more fully with reference to the accompanying drawing which illustrates, by way of example, apparatus suitable for the measurement and delivery of motor spirit, and in which:—

Figures 1 and 2 are respectively longitudinal sections of the apparatus taken at right angles to one another.

Figure 3 depicts a detail on an enlarged scale, and

Figure 4 illustrates a modification in a detail of the apparatus.

Referring to Figures 1 and 2, the apparatus comprises a measuring chamber consisting of a cylinder 1 arranged with its axis vertical and provided in proximity to its lower end with suction and delivery pipes 2 and 3 fitted respectively with non-return valves 4 and 5. The cylinder is fitted with a liquid-tight piston 6 and the upper end is in communication with a rotary pump 7 so designed as to pump liquid in either direction according to the direction in which it is rotated by means of a crank 8 operating through bevel gears 9 or otherwise. The rotary pump 7 also communicates with a vessel 10 made wholly or partially of glass or other transparent material so that its contents may be visible and provided at its upper end with an overflow pipe 11 and a valve 12 adapted to admit air without allowing liquid to escape. For the purpose of limiting the height to which it is possible for liquid in the vessel 10 to rise, an aperture 13 is formed in the pipe 11 which may communicate by such means as a conduit 14 and pipe 15, with a storage reservoir with which the pipe 2 is also connected. The piston 6 is formed with a passage 16 fitted with a spring-loaded lift valve 17 so arranged as to allow liquid to pass from the measuring space underneath the piston to the upper side of the piston. The spring of this valve is, however, sufficiently strong to prevent opening of the valve while the pump 7 is being rotated and the piston 6 is free to move in an upward direction. Assuming the piston to be in its lowest position, rotation of the pump will serve to transfer liquid from below the pump to chamber 37 in which the liquid will rise and fill the glass vessel 10. The piston 6 will be lifted by suction, drawing in a quantity of liquid through the inlet pipe 2 at the bottom of the cylinder 1. The motion permitted to the piston 6 is determined by a stop 18 adjustable as hereinafter described in order to regulate the travel of the piston so that the volume of liquid drawn into the cylinder may be predetermined to a given amount. On the upward motion of the piston being arrested by the stop 18, rotation of the pump 7 may, if the vessel 10 be not then filled, be continued in order to draw liquid through the spring-loaded valve 17 until its level has risen in the vessel 10 to a sufficient extent to cause overflow through the aperture 13. Any air which may exist under the piston 6 or have been drawn in with the liquid is thus sucked from the underside of the piston, and for this purpose, as shown in Figure 3 which is a section of the valve 17, an additional passage 19 fitted with a non-return ball valve 20 is preferably provided, this valve, although not spring-loaded, being so small as not sensibly to interfere with the upward motion of the piston under the suction of the pump. Alternatively, the valve 17 may be so constructed that its spring only comes into action after the valve disc has been lifted off its seal to the slight extent necessary to allow withdrawal of air. The piston is made to fit in the cylinder sufficiently tightly to prevent its descent by its own weight when it has been raised to the top of its stroke and rotation of the pump ceases, even though the passage 19 and ball valve 20 be provided. Rotation of the pump 7 is then reversed and liquid pressure accordingly exerted on the upper side of the piston 6 serving to close both the non-return valves 17 and 20 and to impel the piston in a downward direction thereby securing delivery of the liquid underneath it by the delivery pipe 3. At the same time the surface of the liquid in the vessel 10 will fall to a corresponding degree and by means of suitable graduations it can be seen that the quantity delivered is correct.

In order to prevent inaccuracy of measurement resulting from the kinetic energy of the moving liquid in either the suction or delivery pipes, the apparatus is so constructed that when the piston completes its stroke in the downward direction, that is to say, immediately the measured quantity has been delivered, communication between the suction pipe 2 and the delivery pipe 3 is interrupted. This may be conveniently effected by forming the lower end of the cylinder with an internal annulus 21 the upper surface of which may be machined to cooperate with a correspondingly machined surface on the piston 6. Preferably, however, a loose seating 22, is held in contact with the annulus 21 by springs or the like 23, and the piston 6, on its descent, bears on this seating, thus serving to prevent piston leakage resulting from a continuance of pumping affecting the measurement. The piston is preferably formed with a slight recess as shown for the purpose of increasing the cushioning action this effect being important in order to prevent delivery of an excess quantity due to the kinetic energy of the liquid in the pipe 3. The delivery pipe 3 is introduced within the annulus 21 and the suction pipe 2 is connected to a point in the end or side of the cylinder 1 outside the annulus. In order further to counteract any tendency for the kinetic energy of the moving liquid in the suction or delivery pipe to force through the delivery valve 5 more than the desired quantity, the spring of this valve must be of a certain minimum strength and is preferably so applied as to exert its maximum effort when the valve is closed. To this end the construction depicted in Figure 2 may be adopted, wherein the valve 5 is held on its seat by a spring 24 acting through toggle links 25 and, if desired, supplemented by an auxiliary spring 26.

For the purpose of indicating or recording the amount of liquid measured and delivered, the piston rod may be fitted with a toothed rack 27 co-operating with a pinion 28, the spindle of which is led through the upper part of the cylinder 1 by such means as a stuffing box or the like. The rotary motion thus transmitted to this spindle may be utilized in any suitable manner to operate a counter, such operation, however, only taking place when the piston has completed both its upward and downward strokes; thus no indication or record can take place until the measured quantity has been actually delivered. Alternatively, should it be desired on occasion to deliver a fraction, say one half for example, of the quantity represented by the travel of the piston 6, a suitable stop or the like 29 may be introduced manually into the path of a tooth or its equivalent 30 carried by the indicator spindle, which will serve by means of the toothed rack and pinion to arrest the downward motion of the piston 6 at the desired point and at the same time the corresponding indication or record will be given. For the purpose of indicating or recording the total amount of liquid passed through the apparatus and at the same time to indicate if any delivery has been made by partial strokes of the piston which would not affect the above described indicating or recording device, a totalizing counter may be operated by the toothed pinion 28, being connected to it by a free wheel device so that motion of the piston in an upward direction does not affect the totalizer but the latter is actuated by a complete or partial downward delivery stroke of the piston.

As above mentioned in order accurately to determine the length of stroke of the piston 6 the stop 18 is made adjustable in the axial direction. This may readily be accomplished by mounting it in its supporting member 31 by means of a screw thread, the stop 18 being formed with external teeth 32 adapted to engage a worm 33 fitted to a spindle 34 which projects, by means of a gland or stuffing box 35, through the side of the cylinder 1. By rotation of the spindle 34 the longitudinal position of the stop 18 may thus be adjusted and the stroke of the piston 6 accurately determined.

For the purpose of limiting the suction or pressure exerted on the piston 6 by the pump 7, there may be provided a by-passage 36 connecting the cylinder 1 with the space 37 above the pump. A partition 38 extends across the passage 36 and is provided with spring-loaded non-return valves 39 adapted to pass liquid in opposite directions. On an excess of suction or pressure being exerted within the cylinder 1 by the pump 7, the corresponding valve 39 will open and prevent rise in the suction or pressure beyond a certain value.

In order to ensure that, before reversal of the pump 7, the kinetic energy of the liquid in the suction pipe 2 and cylinder 1 shall be dissipated, it is desirable that reversal of the pump 7 should be delayed slightly to permit its forward motion to be continued by inertia for a short period of time after the piston 6 has made contact with the stop 18 at the top of its stroke. This would not be the case if, immediately the piston 6 has reached the upper end of its stroke, the crank handle were reversed and in order, in such an event, to prevent too rapid a reversal of the pump 7 the drive is preferably transmitted from the bevel gears 9 to the pump spindle through a lost motion device or helical spring 40 or like elastic means.

Figure 4 illustrates a modified means for securing delivery of a fractional portion of the quantity represented by the complete stroke of the piston 6. According to this modification, instead of the employment of a stop 29 interposed in the counting mechanism, means is provided whereby a distance piece 41 may be introduced beneath the stop 18 thereby allowing a portion only of the upward stroke of the piston 6 to be performed: consequently, on the downward stroke of the piston a corresponding fractional quantity of the liquid represented by the complete stroke only is delivered. The distance piece 41 is conveniently carried by a spindle 42 projecting, by means of a gland or stuffing box 43, through the side of the cylinder 1; the distance piece may thus be readily introduced beneath or retracted from the stop 18. In order to make this possible under all conditions of longitudinal adjustment of the stop, the distance piece 41 is preferably mounted on the spindle 42 in a manner allowing it a certain amount of play in the axial direction. Thus, as indicated, the spindle 42 may terminate in a block 44 having studs or screws 45 projecting through lugs on the distance piece 41 and adjusted in the block 44 so that the upper lug on the distance piece 41 normally rests on the block 44, as indicated, and the upper surface of the distance piece is then below the lower surface of the stop 18 even when the latter is adjusted to its lowest position. When the distance piece is inserted below the stop, even if out of contact therewith, on rise of the piston 6 it will be pushed against the stop and thus function in the desired manner. This method of limiting the stroke of the piston possesses certain advantages over that above described; for example, if the stroke be reduced by a stop interposed in the counting mechanism it is obvious that the latter must be of sufficient strength to resist any pressure which, in the normal use of the apparatus, may be applied to the piston, and such strength will generally be considerably in excess of that necessary when the mechanism is merely employed for its normal counting function. Further, it will be seen that the above described adjustment of the stop 18 whereby the full stroke of the piston 6 is accurately determined is also effective when the distance piece 41 has been introduced, whereas, if other means, such as the interposition of a stop in the counting mechcanism, were employed, it would generally be necessary to provide a separate adjustment to ensure accuracy of the partial stroke of the piston. Obviously two or more of such distance pieces representing various fractions of the complete stroke may be adapted to be alternatively inserted in the path of the piston, thereby enabling various fractions of the full quantity represented by the complete stroke to be delivered as may be desired.

Obviously in place of a rotary pump, a reciprocating pump might be employed; the piston of this pump might operate in the same cylinder as the measuring piston and be mechanically connected therewith in such a manner that, by such means as valves arranged in the pistons, a greater quantity of liquid than that actually measured is, on each upward stroke, passed into the glass or like vessel.

What I claim and desire to secure by Letters Patent of the United States is:—

1. Apparatus for the measurement of liquids comprising a measuring vessel, a second vessel at least part of which is transparent, means for simultaneously introducing liquid into and withdrawing it from said measuring and said transparent vessels and means for ensuring that the quantity withdrawn from said transparent vessel corresponds to that withdrawn from said measuring vessel.

2. Apparatus for the measurement of liquids comprising a measuring vessel, a second vessel at least part of which is transparent, means for introducing liquid into said measuring vessel and simultaneously transferring liquid from said measuring vessel to said transparent vessel and means for withdrawing liquid from said measuring vessel and simultaneously transferring a corresponding quantity of liquid from said transparent vessel to said measuring vessel.

3. Apparatus for the measurement of liquids comprising a cylinder, a piston within said cylinder, means for introducing liquid into and withdrawing it from the space enclosed by said cylinder on one side of said piston and constituting a measuring space, a vessel at least part of which is transparent and means for passing liquid in each direction between said transparent vessel and the space in said cylinder on the side of said piston opposite to said measuring space.

4. Apparatus for the measurement of liquids comprising a cylinder, a piston within said cylinder, means for introducing liquid into and withdrawing it from the space enclosed by said cylinder on one side of said piston and constituting a measuring space, a vessel at least part of which is transparent and a reversible pump communicating with said vessel and with the space in said cylinder on the side of said piston opposite to said measuring space.

5. Apparatus for the measurement of liquids comprising a measuring vessel, a second vessel at least part of which is transparent, suction and delivery pipes communicating with said measuring vessel, a non-return valve fitted to each of said pipes, means for drawing liquid into and delivering it from said measuring vessel respectively through said pipes, means for interrupting communication between said pipes when delivery of said liquid has been completed and means for passing liquid in each direction between said measuring and transparent vessels.

6. Apparatus for the measurement of liquids comprising a cylinder, a piston within said cylinder, an annulus in one end of said cylinder, said piston contacting with said annulus at one end of its stroke, suction and delivery pipes communicating with said cylinder within and without said annulus, a vessel at least part of which is transparent and means for passing liquid in each direction between said transparent vessel and said cylinder.

7. Apparatus for the measurement of liquids comprising a cylinder, a piston within said cylinder, an annulus in one end of said cylinder, suction and delivery pipes communicating with said cylindr within and without said annulus, a seating resting on said annulus, a recess in said piston adapted to fit over said seating when said piston is at one end of its stroke, a vessel at least part of which is transparent and means for passing liquid in each direction between said transparent vessel and said cylinder.

8. Apparatus for the measurement of liquids comprising a measuring vessel, a second vessel at least part of which is transparent, a reversible pump for drawing liquid into said measuring vessel and simultaneously transferring liquid from said measuring vessel to said transparent vessel and for delivering liquid from said measuring vessel and simultaneously transferring a corresponding quantity of liquid from said transparent vessel to said measuring vessel, driving means for said pump and a connection between said driving means and said pump including at least one of the following devices, a friction clutch, a lost-motion device, a spring.

9. Apparatus for the measurement of liquids comprising a cylinder, a piston within said cylinder, means for introducing liquid into and withdrawing it from the space enclosed by said cylinder on one side of said piston and constituting a measuring space, a vessel at least part of which is transparent, means for passing liquid in each direction between said transparent vessel and the space in said cylinder on the side of said piston opposite to said measuring space, a by-pass passage between said cylinder and said vessel, a partition across said passage and loaded non-return valves in said partition arranged to pass liquid in opposite directions.

10. Apparatus for the measurement of liquids comprising a cylinder, a piston within said cylinder, means for introducing liquid into and withdrawing it from the space enclosed by said cylinder on one side of said piston and constituting a measuring space, a vessel at least part of which is transparent, means for passing liquid in each direction between said transparent vessel and the space in said cylinder on the side of said piston opposite to said measuring space and an overflow pipe in said vessel.

11. Apparatus for the measurement of liquids comprising a cylinder, a piston within said cylinder, at least one non-return valve in said piston, means for introducing liquid into and withdrawing it from the space enclosed by said cylinder on one side of said piston and constituting a measuring space, a vessel at least part of which is transparent and means for passing liquid in each direction between said transparent vessel and the space in said cylinder on the side of said piston opposite to said measuring space.

12. Apparatus for the measurement of liquids comprising a cylinder, a piston within said cylinder, means for introducing liquid into and withdrawing it from the space enclosed by said cylinder on one side of said piston and constituting a measuring space, a vessel at least part of which is transparent, means for passing liquid in each direction between said transparent vessel and the space in said cylinder on the side of said piston opposite to said measuring space and counting mechanism cooperating with said piston and adapted to be actuated only when withdrawal of liquid from said measuring space has been completed.

13. Apparatus for the measurement of liquids comprising a cylinder, a piston within said cylinder, means for introducing liquid into and withdrawing it from the space enclosed by said cylinder on one side of said piston and constituting a measuring space, a vessel at least part of which is transparent, means for passing liquid in each direction between said transparent vessel and the space in said cylinder on the side of said piston opposite to said measuring space, counting mechanism cooperating with said piston and adapted to be actuated only when withdrawal of liquid from said measuring space has been completed and a totalizing counter adapted to be actuated on any withdrawal of liquid from said measuring space.

14. Apparatus for the measurement of liquids comprising a measuring vessel, a second vessel at least part of which is transparent, means for introducing liquid into said measuring vessel and simultaneously transferring liquid from said measuring vessel to said transparent vessel and means for withdrawing a quantity of liquid from said measuring vessel which is a fraction only of that represented by the full capacity of said measuring vessel and simultaneously transferring a corresponding quantity of liquid from said transparent vessel to said measuring vessel.

15. Apparatus for the measurement of liquids comprising a cylinder, a piston within said cylinder, a stop adapted to arrest motion of said piston at an intermediate point in its stroke, means for introducing liquid into and withdrawing it from the space enclosed by said cylinder on one side of said piston and constituting a measuring space, a vessel at least part of which is transparent and means for passing liquid in each direction between said transparent vessel and the space in said cylinder on the side of said piston opposite to said measuring space.

16. Apparatus for the measurement of liquids comprising a cylinder, a piston within said cylinder, an axially adjustable stop with which said piston is adapted to contact at one end of its stroke, means for introducing liquid into and withdrawing it from the space enclosed by said cylinder on one side of said piston and constituting a measuring space, a vessel at least part of which is transparent and means for passing liquid in each direction between said transparent vessel and the space in said cylinder on the side of said piston opposite to said measuring space.

17. Apparatus for the measurement of liquids comprising a cylinder, a piston within said cylinder, a distance piece adapted to be inserted into or withdrawn from the path of said piston and to make contact at one of its ends with a relatively fixed stop at one end of the piston stroke and at its other end with said piston, means for introducing liquid into and withdrawing it from the space enclosed by said cylinder on one side of said piston and constituting a measuring space, a vessel at least part of which is transparent and means for passing liquid in each direction between the said transparent vessel and the space in said cylinder on the side of said piston opposite to said measuring space.

18. Apparatus for the measurement of liquids comprising a cylinder, a piston within said cylinder, a distance piece adapted to be inserted into or withdrawn from the path of said piston, means for supporting said distance piece in proximity to but out of contact with a relatively fixed stop at one end of the piston stroke and for permitting it to be moved into contact with said stop by the action of said piston bearing on said distance piece, means for introducing liquid into and withdrawing it from the space enclosed by said cylinder on one side of said piston and constituting a measuring space, a vessel at least part of which is transparent and means for passing liquid in each direction between said transparent vessel and the space in said cylinder on the side of said piston opposite to said measuring space.

19. Apparatus for the measurement of liquids comprising a measuring vessel, a second vessel at least part of which is transparent, suction and delivery pipes communicating with said measuring chamber, a non-return valve fitted to each of said pipes, toggle links bearing on said valve fitted to said delivery pipe, a spring connected across said toggle links, means for drawing liquid into and delivering it from said measuring vessel respectively through said pipes and means for passing liquid in each direction between said measuring and transparent vessels.

JOHN FRASER.